United States Patent
Affentranger, Jr.

(10) Patent No.: US 11,848,639 B1
(45) Date of Patent: Dec. 19, 2023

(54) SURFACE MOUNT ASSEMBLIES FOR A SOLAR PANEL SYSTEM

(71) Applicant: Sunrun Inc., San Francisco, CA (US)

(72) Inventor: Martin John Affentranger, Jr., Paso Robles, CA (US)

(73) Assignee: Sunrun Inc., San Francisco, CA (US)

( * ) Notice: Subject to any disclaimer, the term of this patent is extended or adjusted under 35 U.S.C. 154(b) by 0 days.

(21) Appl. No.: 18/118,387

(22) Filed: Mar. 7, 2023

Related U.S. Application Data

(63) Continuation of application No. 17/947,057, filed on Sep. 16, 2022, now Pat. No. 11,695,369.

(51) Int. Cl.
*H02S 20/23* (2014.01)
*F24S 25/61* (2018.01)
*F24S 25/10* (2018.01)
*F16B 19/00* (2006.01)
*H02S 30/00* (2014.01)
*F24S 25/60* (2018.01)
*F24S 25/00* (2018.01)

(52) U.S. Cl.
CPC ............ *H02S 20/23* (2014.12); *F16B 19/008* (2013.01); *F24S 25/10* (2018.05); *F24S 25/61* (2018.05); *H02S 30/00* (2013.01); *F24S 2025/021* (2018.05); *F24S 2025/6005* (2018.05); *Y02E 10/47* (2013.01)

(58) Field of Classification Search
CPC H02S 20/23; H02S 30/00; F24S 25/10; F24S 25/61; F24S 2025/021; F24S 2025/6005; Y02E 10/47
See application file for complete search history.

(56) References Cited

U.S. PATENT DOCUMENTS

| | | | | |
|---|---|---|---|---|
| 4,408,940 A * | 10/1983 | Fischer | ................. | E04B 1/4164 411/401 |
| 6,141,928 A * | 11/2000 | Platt | .................... | E04F 11/1814 52/832 |
| 6,240,689 B1 * | 6/2001 | Haddad | ............... | E04H 12/2261 248/74.1 |
| 7,553,103 B2 * | 6/2009 | Jameson | ................. | E01F 9/608 40/607.01 |
| 7,677,000 B2 * | 3/2010 | Walker | ................ | E04F 11/1812 248/539 |
| 8,235,348 B1 * | 8/2012 | Curtis | ..................... | E01F 9/629 248/548 |

(Continued)

*Primary Examiner* — Jessie T Fonseca
(74) *Attorney, Agent, or Firm* — Kramer Levin Naftalis & Frankel LLP

(57) ABSTRACT

Surface mount assembly for mounting to a solar panel frame to an installation surface is disclosed. In some embodiments, a surface mount assembly includes a base and an enclosure. The base includes a lower member and an upper member. The lower member could include a brace, a center aperture extending through the lower and upper members for receiving a fastener to facilitate the mounting to a solar panel frame; the upper member could include a hub from which a plurality of arms may extend. The mount enclosure could include a chamber with a chamber aperture for receiving a fastener from the surface mount, a post support extending upward from the chamber and forming a post aperture for receiving a post, and a horizontal member with one or more sealant grooves extending horizontal outward from the chamber.

18 Claims, 15 Drawing Sheets

(56) References Cited

U.S. PATENT DOCUMENTS

| | | | | |
|---|---|---|---|---|
| 8,448,407 B1* | 5/2013 | Wiener | | F16B 43/001 |
| | | | | 52/173.3 |
| 8,714,511 B2* | 5/2014 | Zoeteman | | A45B 11/00 |
| | | | | 248/537 |
| 9,238,922 B2* | 1/2016 | Intagliata | | E04H 12/347 |
| 9,874,024 B2* | 1/2018 | Green | | E04F 11/1846 |
| 9,976,298 B2* | 5/2018 | Bergman | | E04B 1/486 |
| 10,767,684 B1* | 9/2020 | Meine | | F16B 37/14 |
| 11,441,588 B1* | 9/2022 | Bradford | | F16B 5/02 |
| 2011/0240207 A1* | 10/2011 | Stanley | | F24S 25/61 |
| | | | | 156/536 |
| 2011/0303807 A1* | 12/2011 | Van Walraven | | E04D 13/12 |
| | | | | 248/346.06 |
| 2012/0233958 A1* | 9/2012 | Stearns | | H01Q 1/1221 |
| | | | | 52/708 |
| 2013/0009025 A1* | 1/2013 | Stearns | | G09F 7/18 |
| | | | | 248/237 |
| 2013/0074441 A1* | 3/2013 | Stearns | | E04D 13/10 |
| | | | | 52/705 |
| 2013/0091787 A1* | 4/2013 | Puga | | F24S 25/61 |
| | | | | 52/173.3 |
| 2013/0298494 A1* | 11/2013 | Corsi | | F24S 25/61 |
| | | | | 52/705 |
| 2013/0320161 A1* | 12/2013 | Merhar | | F16M 11/00 |
| | | | | 248/121 |
| 2014/0331594 A1* | 11/2014 | Stearns | | F16B 43/001 |
| | | | | 52/705 |
| 2016/0040431 A1* | 2/2016 | Stanley | | F24S 25/61 |
| | | | | 52/741.4 |
| 2016/0248368 A1* | 8/2016 | Seery | | F24S 25/61 |
| 2016/0248369 A1* | 8/2016 | Almy | | F24S 25/61 |
| 2016/0268957 A1* | 9/2016 | Liptak | | E04D 12/002 |
| 2017/0279403 A1* | 9/2017 | Seery | | H02S 20/23 |
| 2018/0167023 A1* | 6/2018 | Meine | | H02S 20/23 |
| 2020/0096155 A1* | 3/2020 | Georgeau | | H02S 20/23 |
| 2020/0248457 A1* | 8/2020 | Shadwell | | F24S 25/61 |
| 2020/0400272 A1* | 12/2020 | Patton | | E04D 13/00 |
| 2022/0034093 A1* | 2/2022 | Shadwell | | H02S 20/24 |
| 2022/0099136 A1* | 3/2022 | Meine | | E04D 15/04 |
| 2022/0228704 A1* | 7/2022 | Sargent | | E04G 21/3219 |

* cited by examiner

US 11,848,639 B1

SURFACE MOUNT ASSEMBLIES FOR A SOLAR PANEL SYSTEM

CROSS-REFERENCE TO RELATED APPLICATION

This application is a continuation of U.S. patent application Ser. No. 17/947,057, filed on Sep. 16, 2022, and entitled "SURFACE MOUNT ASSEMBLIES FOR A SOLAR PANEL SYSTEM," which is hereby incorporated by reference in its entirety.

TECHNICAL FIELD

The present invention relates to solar panel systems, and in particular, to mounting assemblies installed to installation surface of a solar panel system.

BACKGROUND

Building-mounted structures are typically secured to a building surface with one or more mounting assemblies. Each assembly may include multiple components which, when coupled together, facilitate the ability to mount solar components above an installation surface to which solar panel modules may be mounted during the installation of systems designed to generate solar power.

When mounts are coupled to an installation surface, multiple fasteners may be employed to couple one mount. When multiple mounts are used to mount multiple components, the amount of time and man-power necessary are not insignificant. Moreover, many mounts are exposed to the environment and susceptible to foreign contamination such as water incursion. Although one or more types of flashings may be mounted on the installation surface with the mount to prevent water incursion, these are separate components, thereby consuming the amount of time and man-power needed when installing components of a solar power generation system.

SUMMARY

Embodiments of the inventive concepts disclosed herein are directed to a surface mount needing only one fastener to be coupled to the installation surface and only one fastener needed to mount a surface mount enclosure, where the surface mount and surface mount enclosure may facilitate a solar module frame of a solar module or an array of solar modules to be suspended above the installation surface.

In one aspect, embodiments of the inventive concepts disclosed herein are directed to a surface mount for mounting to a solar panel frame to an installation surface. The mount could include a base having a lower member and an upper member. The lower member could include a brace, a center aperture extending through the lower and upper members for receiving a fastener to facilitate the mounting a surface mount enclosure. The upper member could include a hub from which a plurality of arms may extend.

In a further aspect, embodiments of the inventive concepts disclosed herein are directed to a surface mount enclosure for mounting to a solar panel frame to an installation surface. The mount enclosure could include a chamber with a chamber aperture for receiving a fastener from the surface mount, a post support extending upward from the chamber and forming a post aperture for receiving a post, and a horizontal member with one or more sealant grooves extending horizontal outward from the chamber. The chamber aperture may be configured to align with a base aperture of a base and receive a distal end of a fastener extending upwardly through the base aperture.

In a further aspect, embodiments of the inventive concepts disclosed herein are directed to a surface mount assembly comprised of the base of the surface mount assembly coupled to the surface mount enclosure, where the post received in the post enclosure engages the fastener extending through the base and chamber aperture. After the base is mounted to the installation surface, the brace of the base engages the installation surface. In some embodiments, the presence of the base facilitates the mounting of the base with one fastener only. Thereafter, upon the engagement of the post with the fastener and the tightening of the post, an upper surface of the hub of the base is drawn towards an inner surface of the chamber until both surfaces engage one another as the surface mount enclosure engages the installation surface.

BRIEF DESCRIPTION OF THE DRAWINGS

For a fuller understanding of the inventive embodiments, reference is made to the following description taken in connection with the accompanying drawings in which.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1A:
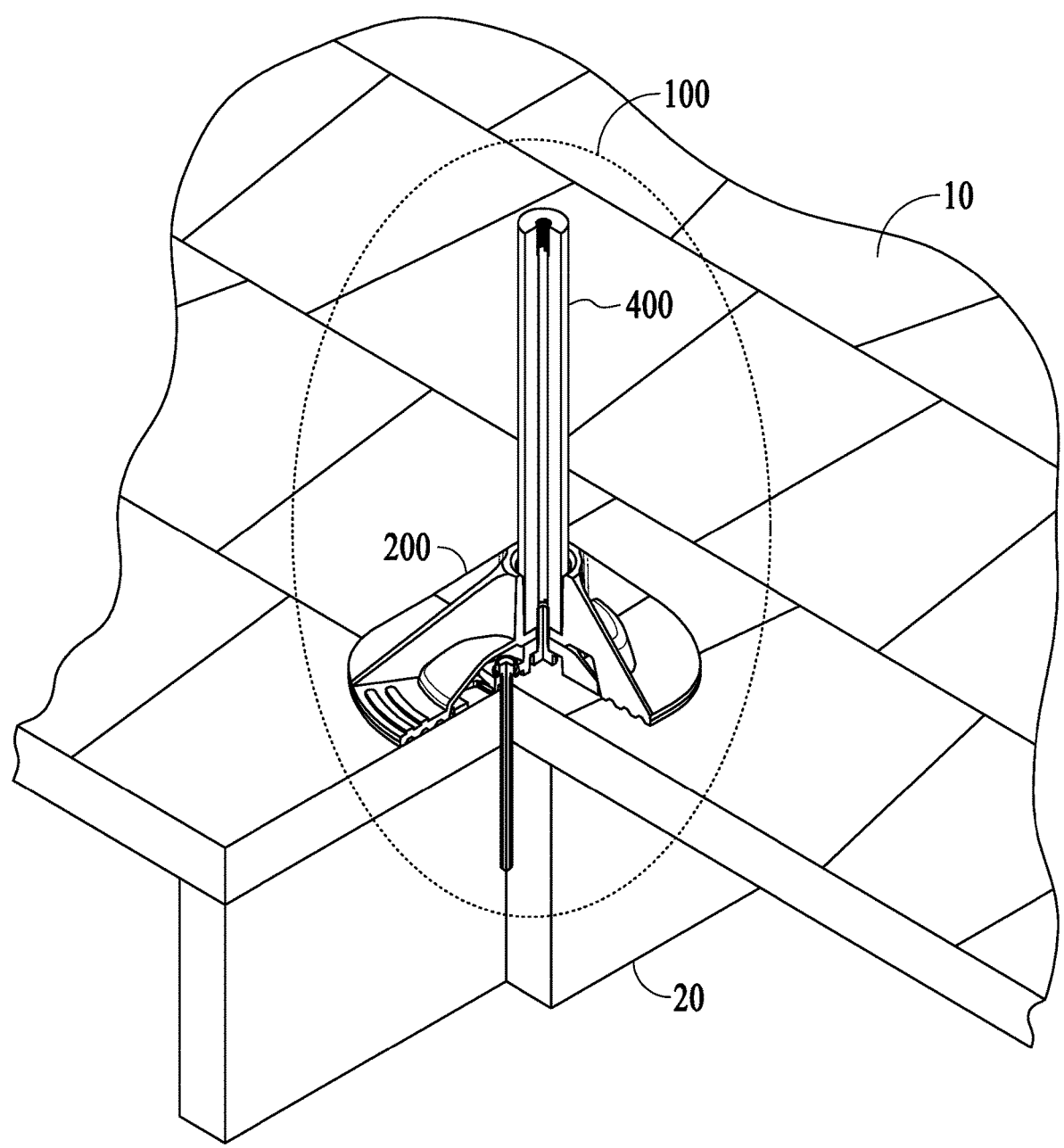
FIG. 1A illustrates a mount assembly installed or mounted on an installation surface, in accordance with some embodiments.
Figure 1B:
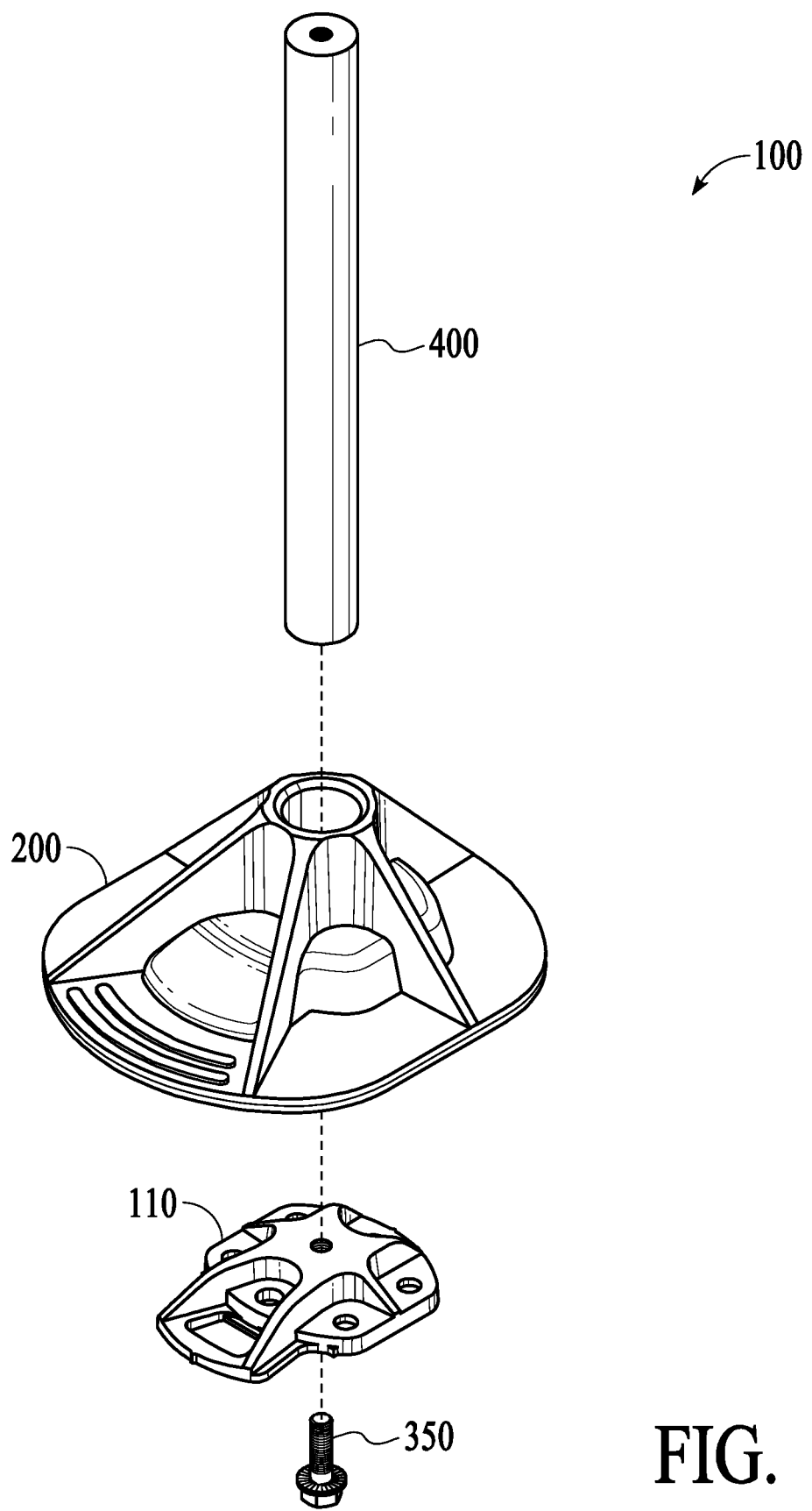
FIG. 1B illustrates an exploded view of the mount assembly, in accordance with some embodiments.
Figure 1C:
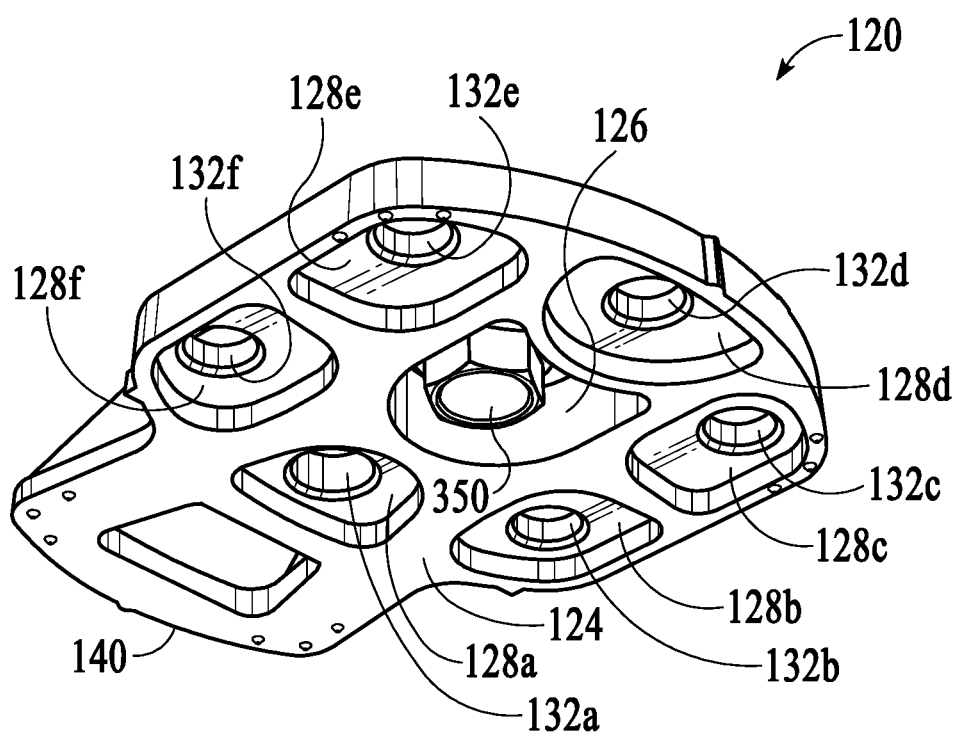
FIGS. 1C and 1D illustrate isometric and orthogonal bottom views of a base of the mount assembly; in accordance with some embodiments.
Figure 1D:
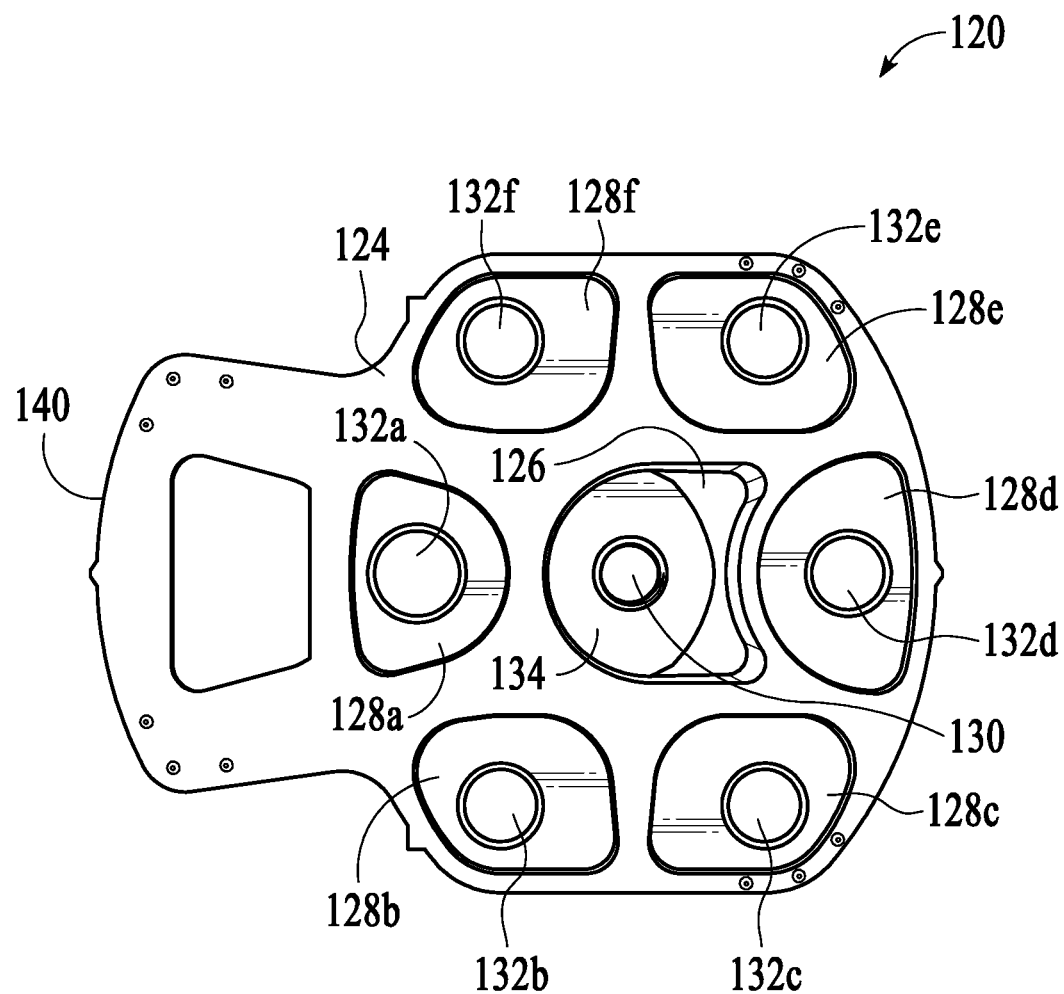
Figure 1E:
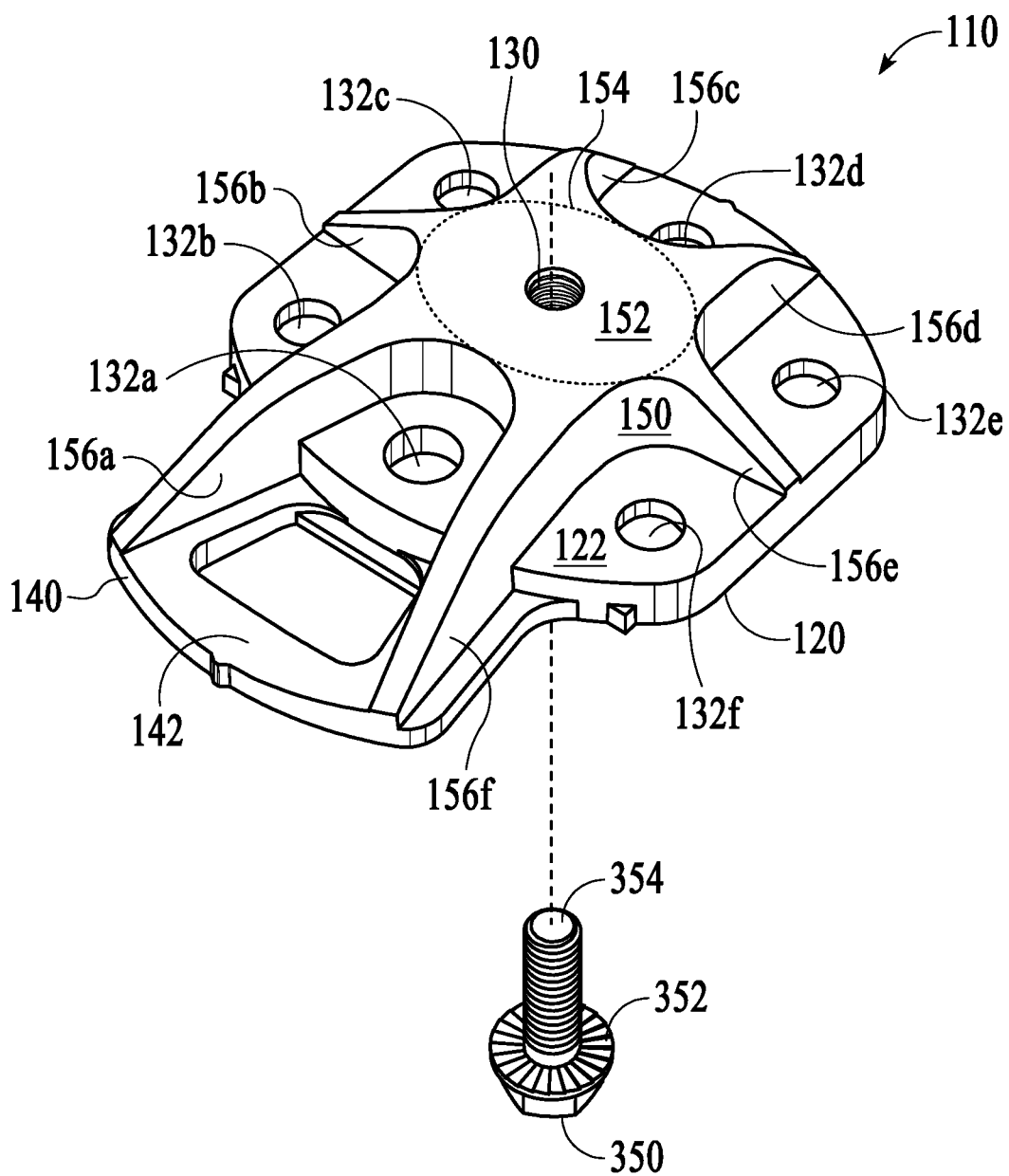
FIGS. 1E and 1F illustrate isometric and orthogonal top views of the base, respectively, in accordance with some embodiments.
Figure 1F:
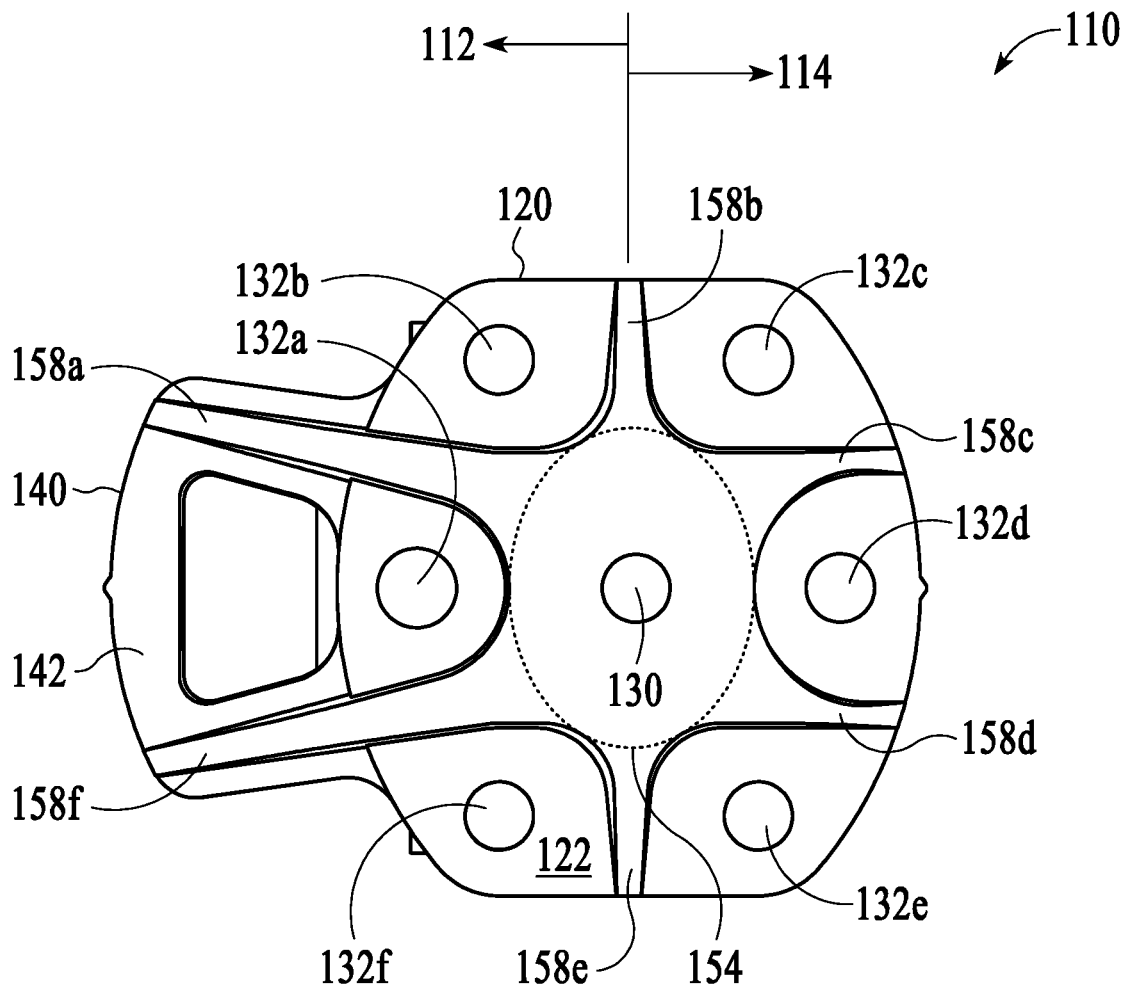
Figure 1G:
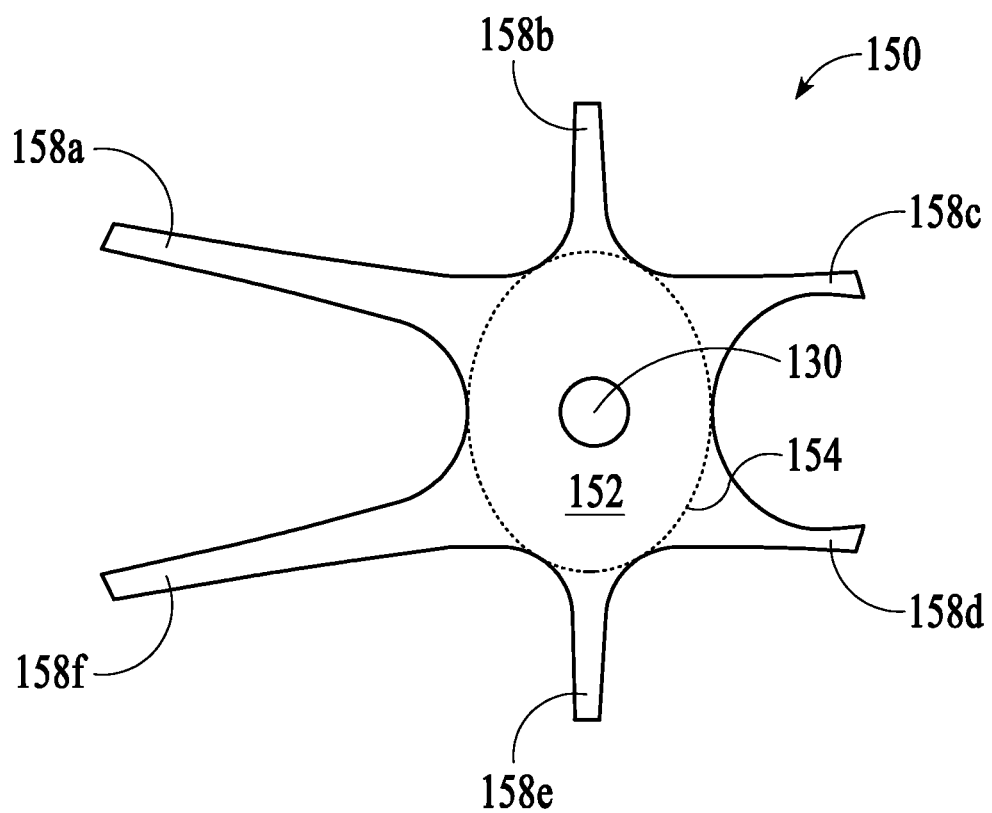
FIG. 1G illustrates orthogonal top view of an upper member of the base, in accordance with some embodiments.

FIG. 1A illustrates mount assembly 100 installed or mounted on an installation surface 10 such as a roof and underlying support structure 20. FIG. 1B illustrates an exploded view of mount assembly 100 including a base 110, an enclosure 200, and fastening hardware of a fastener 350 and post 400 for coupling base 110 to enclosure 200. FIGS. 1C and 1D illustrate isometric and orthogonal bottom views of base 110, respectively; FIGS. 1E and 1F illustrate isometric and orthogonal top views of base 110, respectively; and FIG. 1G illustrates a top view of base upper member 150.

Base 110 may be divided into forward and aft portions 112 and 114, respectively, and comprised of a lower member 120 and an upper member 150. In some embodiments, lower member 120 and upper member 150 are integral with one another. Lower member 120 may include an upper surface 122 and a lower surface 124. In some embodiments, lower surface 124 could include a center cavity 126. In some embodiments, lower surface 124 could include a plurality of cavities 128a through 128f, inclusive.

Base 110 includes an aperture 130 extending between an upper surface 152 of upper member 150 and cavity 126, and a plurality of apertures 132a through 132f, extending between upper surface 122 and cavities 128a through 128f, respectively. In some embodiments, sealant could be applied to cavity 126 and cavities 128a through 128f prior to base 110 being mounted to installation surface 10 to prevent moisture incursion. Aperture 130 may be threaded to receive complementary threads of fastener 350 extending upwardly from cavity 126 prior to base 110 being mounted to installation surface 10 until lower surface 352 of fastener 350 engages a flat upper surface 134 of cavity 126 and distal end 354 of fastener 350 completes its travel through aperture 130.

Although the preceding discussion includes cavity 126 and aperture 130 that is threaded, the embodiments herein are not limited to these. For example, a flush fastener, such as but not limited to a persert flush fastener, may be pressed against lower surface 124 and inserted or pressed into aperture 130 such that a distal end of the flush fastener extends beyond upper surface 152 of upper member 150 and a portion 220 of outer surface 218 of chamber 250 to engage post 400 as discussed below.

Forward portion 112 of lower member 120 includes a brace 140 extending outwardly from lower member 120. In some embodiments, brace 140 will enable the ability for an installer to mount base 110 to installation surface 10 using one fastener only inserted into aperture 132a as discussed below for FIGS. 3A through 3C, inclusive. When installed, brace 140 prevents base 110 from tilting forward after mount assembly 100 is mounted to installation surface 10. Should any structure mounted to post 400 experience external forces imparted by external environmental conditions, resulting forces imparted to base 110 in the forward direction arising from these external forces could cause base 110 to tilt forward but for the presence of brace 140.

Upper member 150 may include upper surface 152 having a hub 154 that includes aperture 130 and from which a plurality of arms 156a through 156f, inclusive. Upper surface 152 may include upper surfaces 158a through 158f, respectively, extend outwardly and downwardly from hub 154 until upper surfaces 156a and 156f reach the edge of upper surface 144 of brace 142, as shown, and upper surfaces 158b through 158e reach the of upper surface 122 of lower member 120, as shown. As observed, the individual extended lengths of arms 156a and 156f extending from hub 152 are greater the individual extended lengths of arms 156b through 156e, inclusive.

Figure 2A:
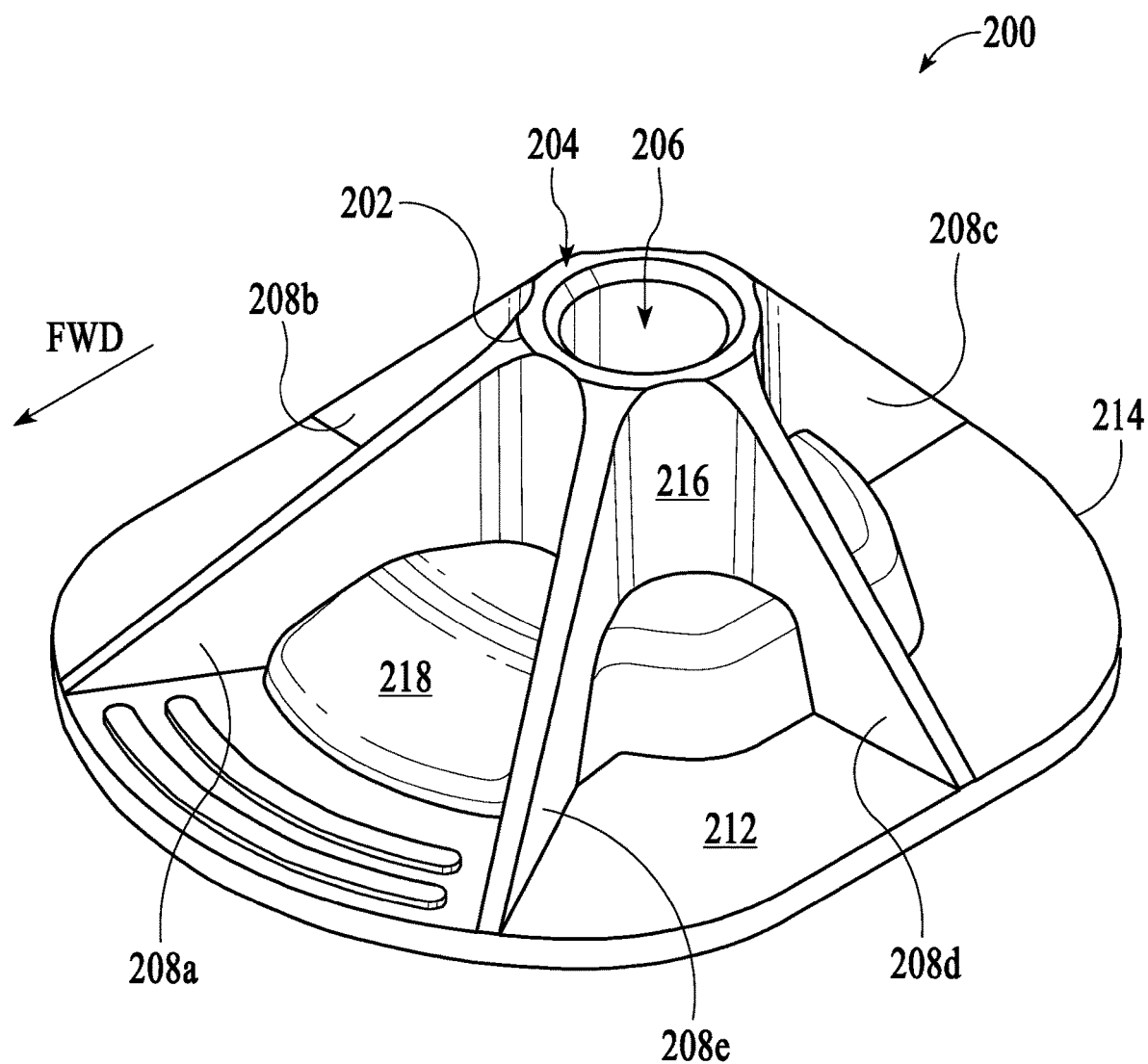
FIGS. 2A and 2B illustrate isometric and orthogonal top views of an enclosure of the mount assembly, respectively, in accordance with some embodiments.
Figure 2B:
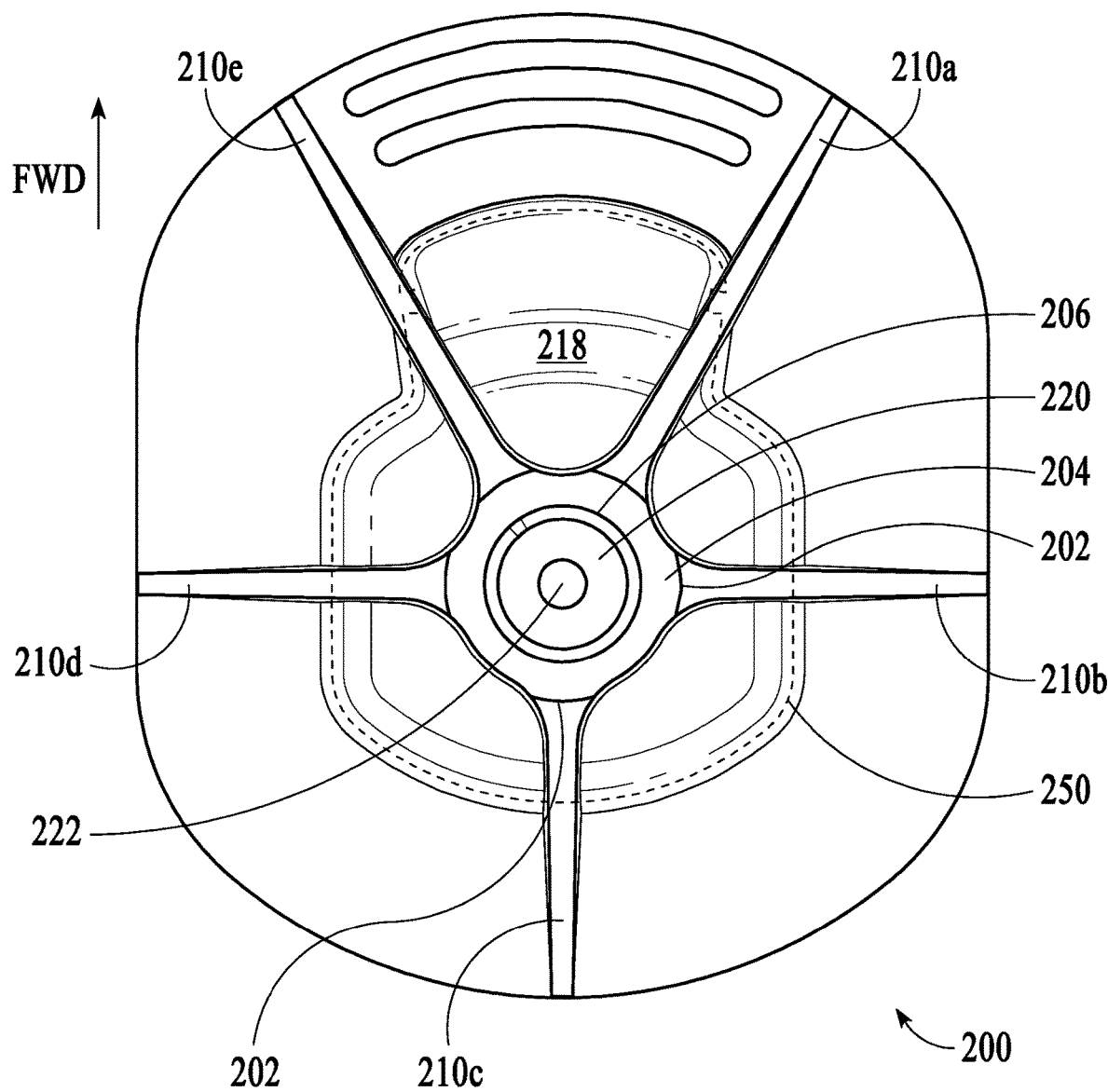
Figure 2C:
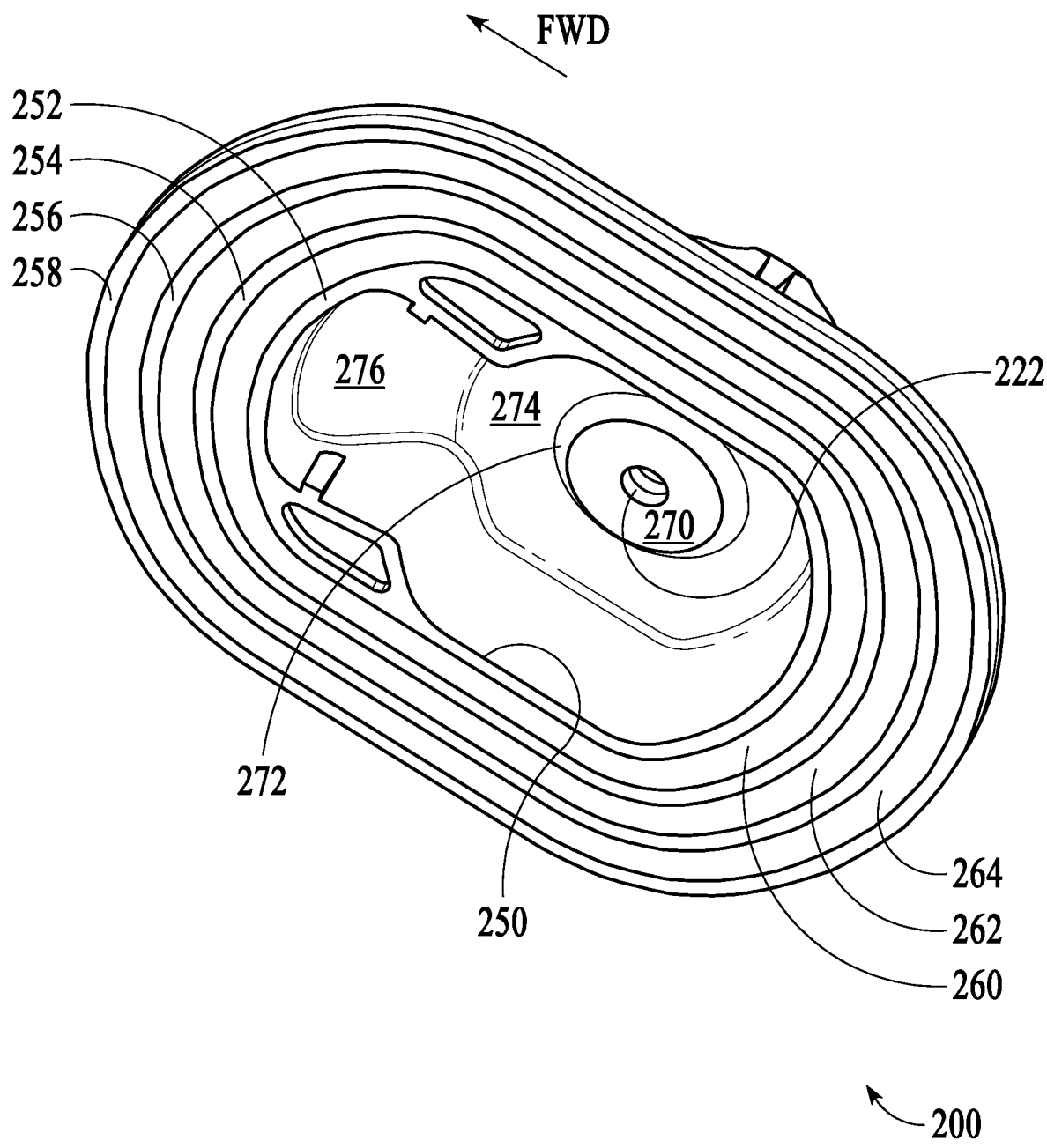
FIGS. 2C and 2D illustrate isometric and orthogonal bottom views of the enclosure, in accordance with some embodiments.
Figure 2D:
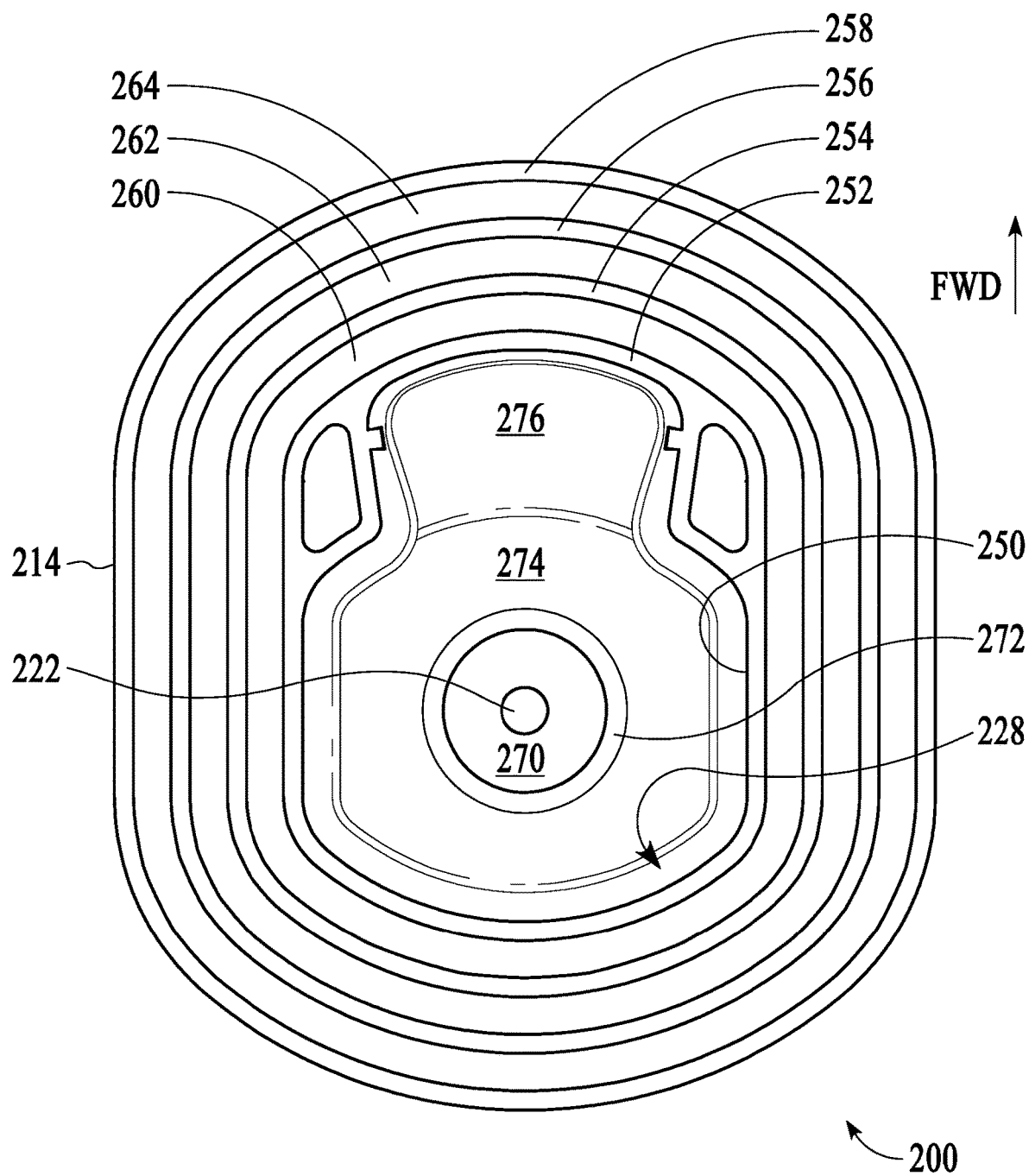
Figure 2E:
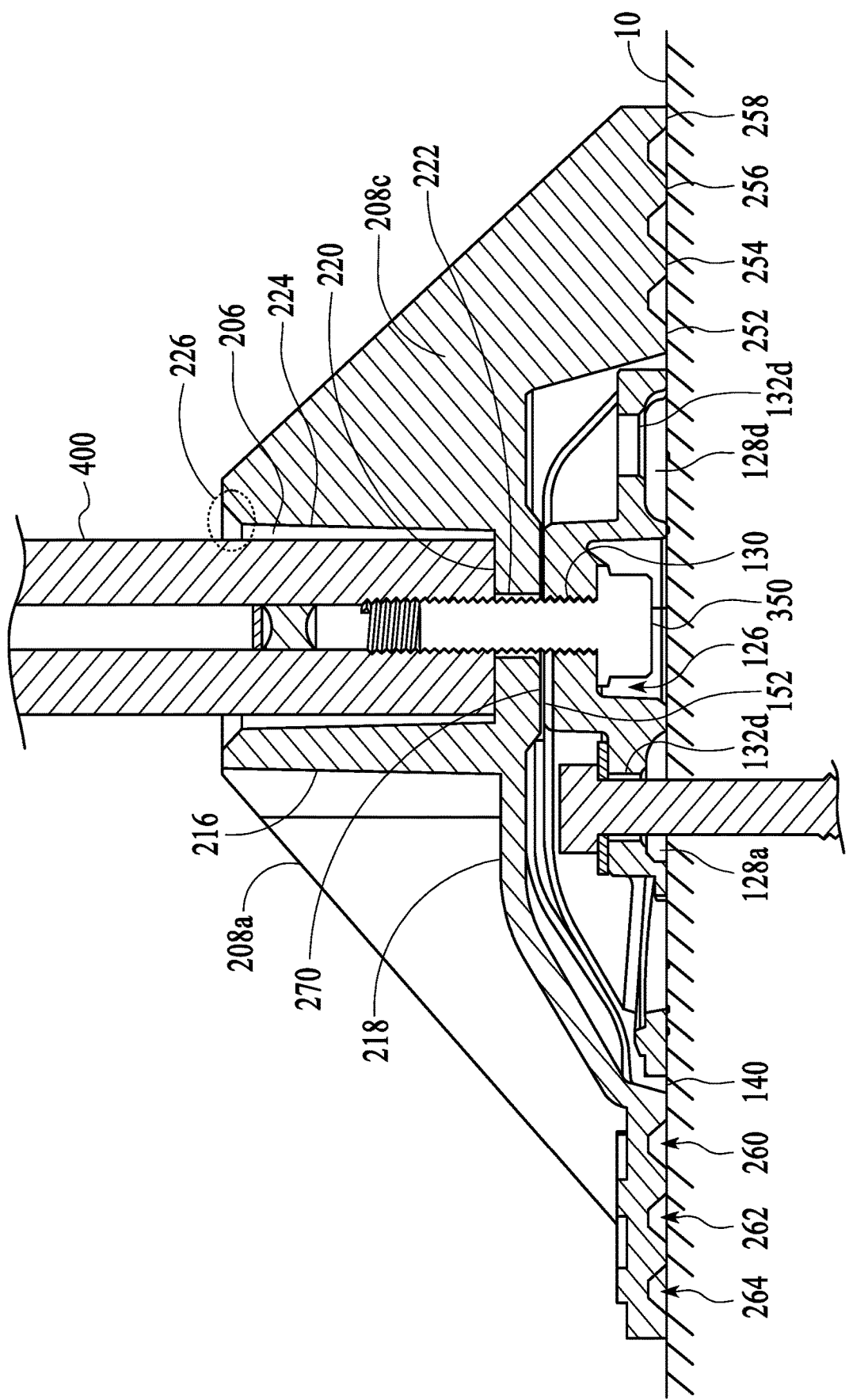
FIG. 2E illustrates a cross-sectional view of the mount assembly mounted on the installation surface, in accordance with some embodiments.

FIGS. 2A and 2B illustrate isometric and orthogonal top views of enclosure 200, respectively; FIGS. 2C and 2D illustrate isometric and orthogonal bottom views of enclosure 200; and FIG. 2E illustrates a cross-sectional view of mount assembly 100 mounted to installation surface 10. Enclosure 200 includes a chamber 250 and horizontal lower member 214 extending outwardly from the perimeter at the bottom of chamber 250. Enclosure 200 includes a vertical post support 216 extending upwardly from an outer surface 218 of chamber 250 until reaching a distal end 202 having an upper surface 204. A plurality of arms 208a through 208e, inclusive, extend outwardly from an outer surface of vertical post support 216, where each have upper surfaces 210a through 210e, respectively, extending downwardly from upper surface 204 until reaching an upper surface 212 of horizontal lower member 214.

Vertical post support 216 forms a post aperture 206 for receiving post 400 when mounting enclosure 200 to installation surface 10 once base 110 has been mounted to installation surface 10. Post aperture 206 includes an inner surface 224 extending upwardly from portion 220 of outer surface 218 of chamber 250 until reaching a lip 226 at upper surface 204. In some embodiments, portion 220 is configured with a flat surface to engage a flat surface of post 400.

Lower surface of horizontal lower member 214 includes outwardly extending parallel walls 252, 254, 256, and 258 forming parallel grooves 260, 262, and 264, as shown, for receiving sealant upon the mounting of enclosure 200 to installation surface 10.

Inner surface of chamber 250 includes a lower portion 270 with an aperture 222 extending to portion 220 of outer surface 218 of chamber 250. Lower portion 270 may be configured or designed with a surface to engage the surface of hub 152 of base 110 when enclosure 200 is mounted to installation surface 10 above base 110. In some embodiments, the surface of lower portion 270 and the surface of hub 152 are flat surfaces.

Distal end 354 of fastener 350 extends upwardly through aperture 222 to engage internal threads of post 400. To mount enclosure 200 to installation surface 10, post 400 engages distal end 354 of aperture 250 and tightened to drive post 400 downward until reaching horizontal inner surface 220 of post aperture 206 and a desired compressive force between post 400 and horizontal inner surface 220 of post aperture 206 and between lower portion 270 of inner surface of chamber 250 and hub 152 of base 110 are reached. Upon installation of enclosure 200, an installer could apply sealant to assist in the prevention of water incursion into chamber 250.

Inner surface of chamber 250 includes a portion 272 extending upwardly from lower portion 270 until reaching an upper portion 274. Also, inner surface of chamber 250 includes a portion 276 extending downwardly from upper portion 274 until reaching wall 252.

Referring now to FIGS. 3A through 3I, there are many fastener configurations that may be employed as illustrated when mounting base 110 to installation surface 10. It should be noted that, although only nine configurations are presented, these are presented for the sole purpose of illustration only; with six apertures 132a through 132f, inclusive, available from which to choose, there are many more alternative fastener configuration(s) and type of fastener(s) from which an installer may choose.

Figure 3C:
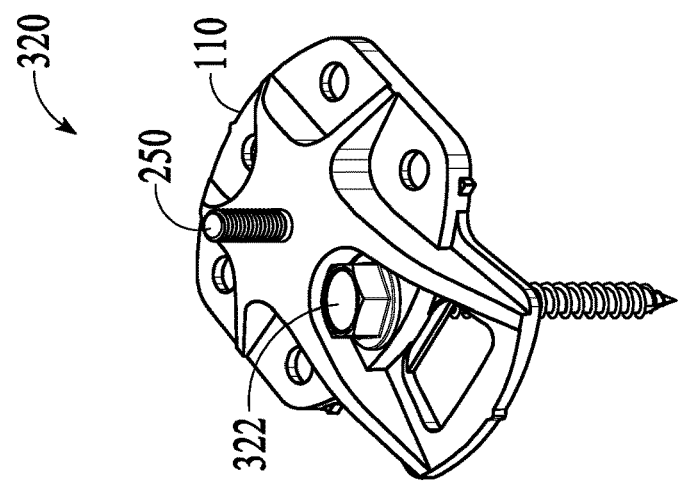
FIGS. 3A through 3I, inclusive, illustrate various fastener configurations that may be employed when mounting the base to the installation surface, in accordance with some embodiments.
Figure 3B:
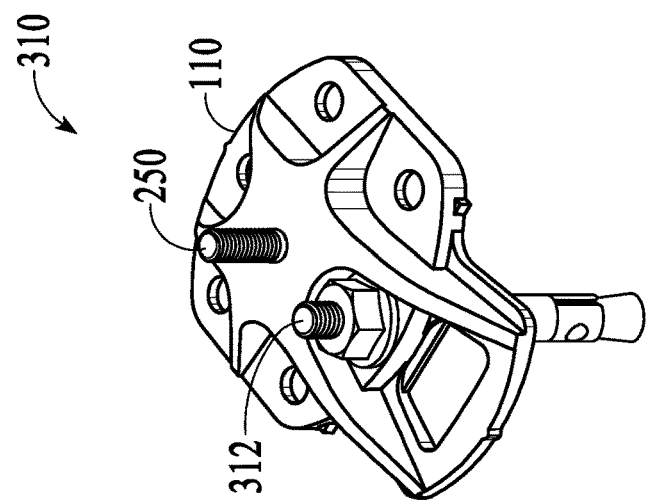
Figure 3A:
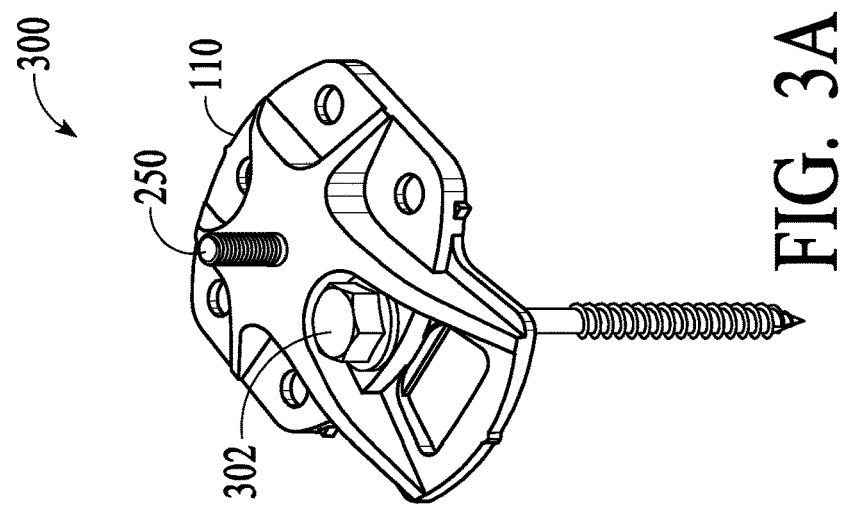

As shown in FIG. 3A, base 110 may mounted to installation surface 10 with a fastener configuration 300 employing including one 5-16 inch lag screw 302 in aperture 132a.

As shown in FIG. 3B, base 110 may mounted to installation surface 10 with a fastener configuration 310 employing one ⅜ inch concrete anchor 312 in aperture 132a.

As shown in FIG. 3C, base 110 may mounted to installation surface 10 with a fastener configuration 320 employing one 5/16 inch concrete screw 322 in aperture 132a.

Figure 3F:
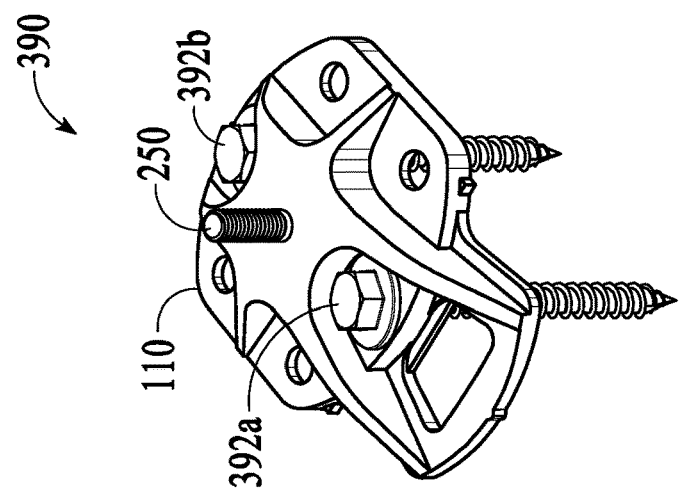
Figure 3E:
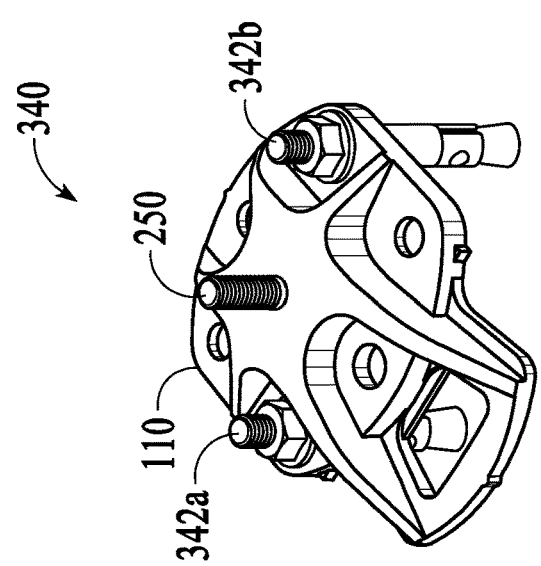
Figure 3D:
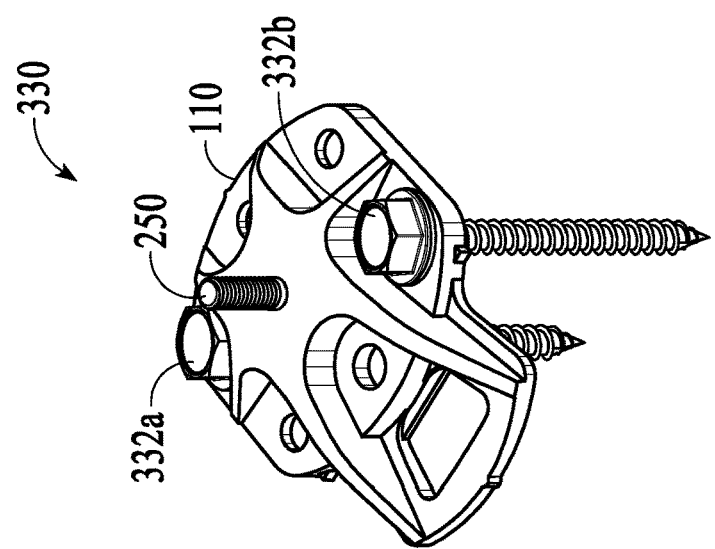

As shown in FIG. 3D, base 110 may mounted to installation surface 10 with a fastener configuration 330 employing two 1/4 inch concrete screws 332a and 332b in respective apertures 132c and 132f.

As shown in FIG. 3E, base 110 may mounted to installation surface 10 with a fastener configuration 340 employing two 1/4 inch concrete anchors 342a and 342b in respective apertures 132b and 132e.

As shown in FIG. 3F, base 110 may mounted to installation surface 10 with a fastener configuration 390 employing two 1/4 inch lag screws 392a and 392b in respective apertures 132a and 132d.

Figures 3G, 3H, 3I:
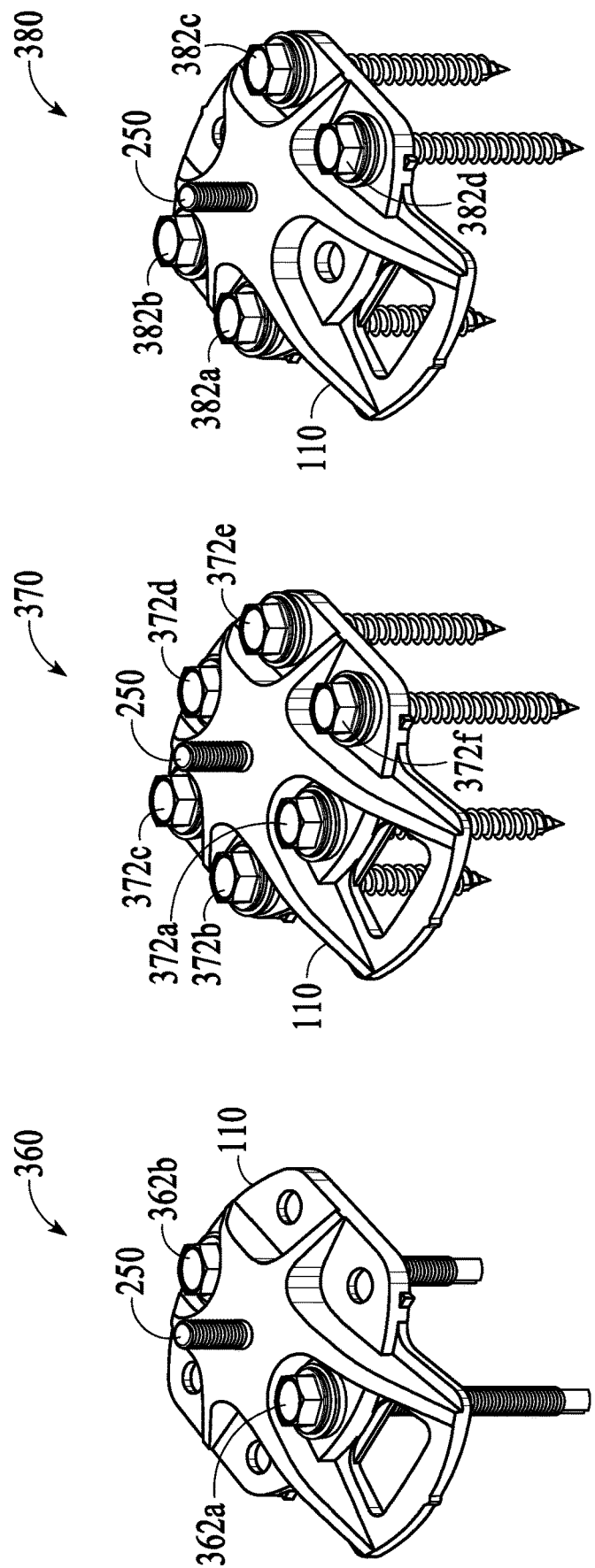

As shown in FIG. 3G, base 110 may mounted to installation surface 10 with a fastener configuration 360 employing two 1/4 inch metal screws 362a and 362b in respective apertures 132a and 132d.

As shown in FIG. 3H, base 110 may mounted to installation surface 10 with a fastener configuration 370 employing six 1/4 inch wood screws 372a through 372f, inclusive, in respective apertures 132a through 132f, inclusive.

As shown in FIG. 3I, base 110 may mounted to installation surface 10 with a fastener configuration 380 employing four 1/4 inch wood screws 382a, 382b, 382c, and 382d in respective apertures 132b, 132c, 132e, and 132f.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed is:

1. A method for mounting a surface mount to an installation surface, comprising:
   inserting a distal end of a first fastener into a first aperture from a bottom surface of a lower member of a base of a surface mount, where
      the first aperture extends from the bottom surface to an upper surface of a hub of an upper member of the base;
   applying sealant to a cavity of the bottom surface at the first aperture;
   placing the bottom surface against an installation surface, such that
      the distal end of the first fastener extends through the first aperture and above the upper surface of the hub;
   inserting a second fastener into a second aperture extending between an upper surface of the lower member and the bottom surface; and
   applying a tightening force to the second fastener until the base is mounted to the installation surface.

2. The method of claim 1, further comprising:
   applying sealant to a cavity of the bottom surface at the second aperture prior to the tightening force being applied to the second fastener.

3. The method of claim 1, wherein the second aperture is located between the first aperture and a brace extending outwardly from one side of the lower member.

4. The method of claim 1, wherein the mounting of the base to the installation surface facilitates an engagement between the base and a surface mount enclosure.

5. The method of claim 4, wherein the distal end of the first fastener extends upwardly through both chamber and post apertures of the surface mount enclosure to facilitate the engagement with a post received in the post aperture.

6. The method of claim 5, wherein the engagement of the distal end of the first fastener with the post facilitates a mounting of the surface mount enclosure to the installation surface after the base is mounted to the installation surface.

7. A method for mounting a surface mount to an installation surface, comprising:
   applying sealant to at least one cavity of a bottom surface of a base of a surface mount;
   placing the bottom surface against an installation surface, where
      a threaded member extends above an upper surface of the base;
   inserting a fastener into an aperture in a forward portion of the base and extending between the bottom surface and an upper surface of the surface mount, where
      the forward portion includes a brace configured to prevent the base from tilting when an external force is imparted on the base in the direction of the brace; and
   applying a tightening force to the fastener until the base is mounted to the installation surface.

8. The method of claim 7, further comprising:
   applying the sealant to the at least one cavity of the bottom surface prior to the tightening force being applied to the fastener.

9. The method of claim 7, wherein the threaded member is a threaded end of a fastener extending through an aperture of the surface mount.

10. The method of claim 7, wherein the threaded member is configured to engage a post received in a post aperture of a surface mount enclosure after extending upwardly through a chamber aperture of the surface mount enclosure.

11. The method of claim 7, wherein the mounting of the base to the installation surface facilitates an engagement between the base and a surface mount enclosure.

12. A method for mounting a surface mount enclosure to an installation surface, comprising:
   placing a surface mount enclosure against an installation surface and above a surface mount mounted to an installation surface with at least one first fastener;
   engaging a post positioned within a post aperture of the surface mount enclosure with a threaded member extending through a chamber aperture of the surface mount enclosure; and
   applying a tightening force to the post engaged with the threaded member until the surface mount enclosure is mounted to the installation surface.

13. The method of claim 12, further comprising:
   applying sealant into at least one groove of a horizontal member extending horizontally and outwardly from a perimeter of a chamber of the surface mount enclosure.

14. The method of claim 12, wherein the threaded member is a threaded end of a fastener extending through an aperture of the surface mount.

15. The method of claim 14, wherein the fastener is a flush fastener pressed against a bottom surface of the surface mount.

16. The method of claim 12, wherein one fastener of the at least one first fastener mounting the surface mount to the installation surface is positioned in an aperture located between a plurality of arms extending from a hub of the surface mount.

17. The method of claim 16, wherein a flat surface of the hub compressively engages a flat surface of a chamber of the surface mount enclosure when the surface mount enclosure is mounted to the installation surface.

18. The method of claim 17, wherein the chamber aperture extends between the flat surface of the chamber and the post aperture.

* * * * *